No. 609,231. Patented Aug. 16, 1898.
J. J. HICKS & G. H. ZEAL.
MEANS FOR INDICATING A SHIP'S ROLL.
(Application filed Nov. 18, 1897.)
(No Model.) 3 Sheets—Sheet 1.

Witnesses.
Inventors.
James Joseph Hicks.
Giles Henry Zeal.

No. 609,231. Patented Aug. 16, 1898.
J. J. HICKS & G. H. ZEAL.
MEANS FOR INDICATING A SHIP'S ROLL.
(Application filed Nov. 18, 1897.)
(No Model.) 3 Sheets—Sheet 2.

Witnesses. Inventors.

No. 609,231. Patented Aug. 16, 1898.
J. J. HICKS & G. H. ZEAL.
MEANS FOR INDICATING A SHIP'S ROLL.
(Application filed Nov. 18, 1897.)

(No Model.) 3 Sheets—Sheet 3.

Witnesses. Inventors.

UNITED STATES PATENT OFFICE.

JAMES J. HICKS AND GILES H. ZEAL, OF LONDON, ENGLAND; SAID ZEAL ASSIGNOR TO SAID HICKS.

MEANS FOR INDICATING A SHIP'S ROLL.

SPECIFICATION forming part of Letters Patent No. 609,231, dated August 16, 1898.

Application filed November 18, 1897. Serial No. 658,937. (No model.)

*To all whom it may concern:*

Be it known that we, JAMES JOSEPH HICKS and GILES HENRY ZEAL, subjects of the Queen of Great Britain, residing at London, England, have invented certain new and useful Improvements in Means for Indicating a Ship's Roll and for Giving other Indications and Alarms, of which the following is a full, clear, and exact description.

The invention has for its object improvements in means for indicating a ship's roll and for giving other indications and alarms.

The invention is illustrated in the accompanying drawings, in which—

Figure 1:
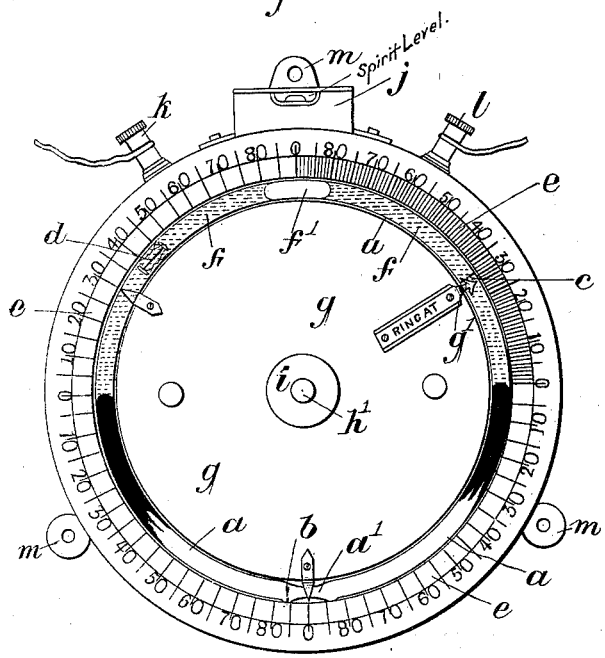
Figure 3:
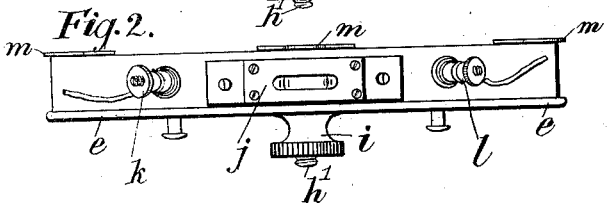
Figure 2:
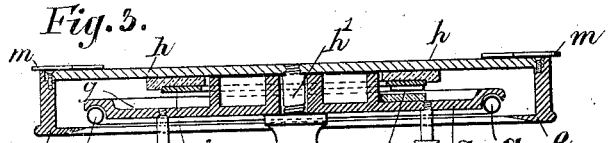
Figure 5:
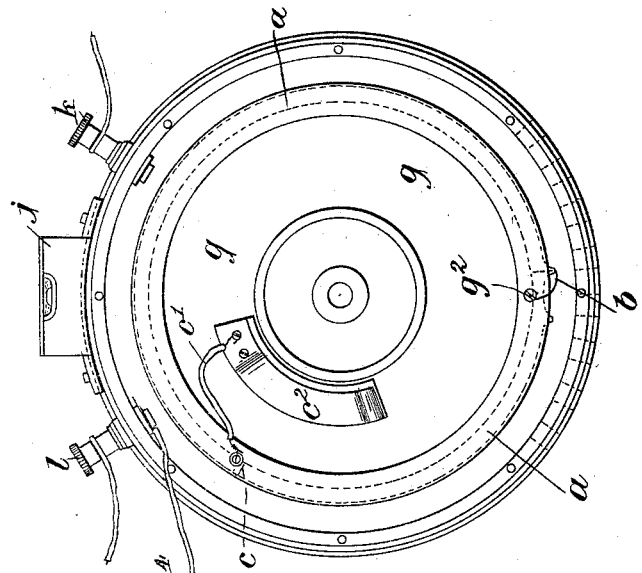
Figure 4:
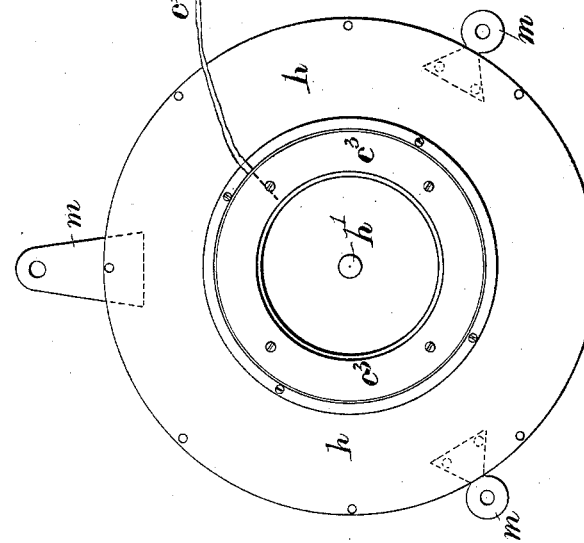
Figure 7:
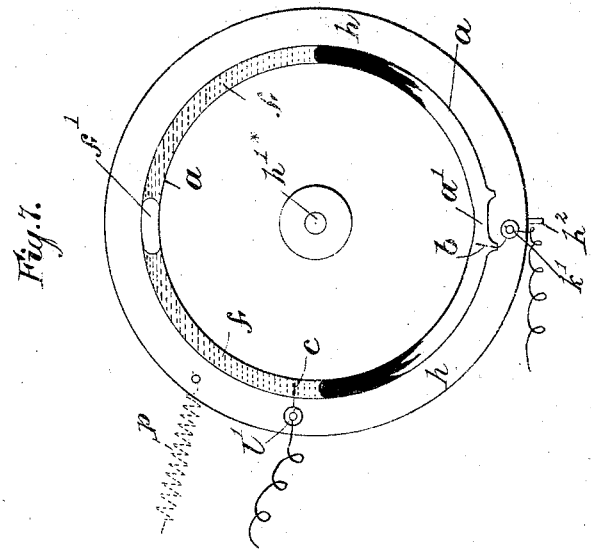
Figure 6:
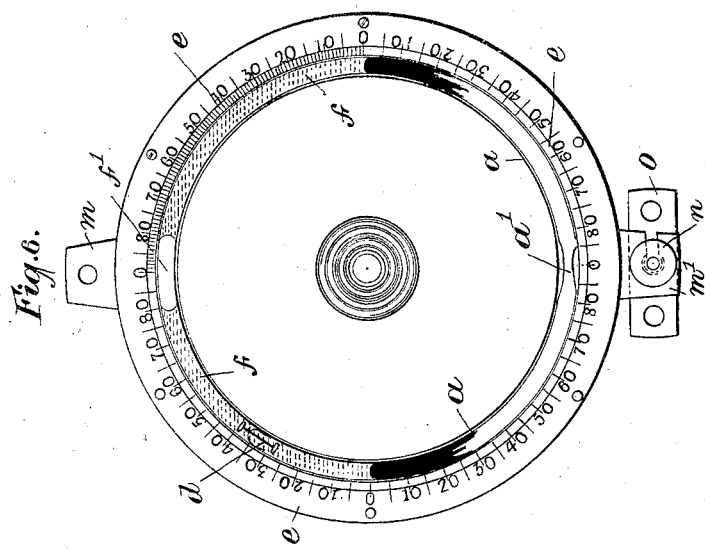

Figure 1 is a front view of the instrument in its most complete form and capable of electrically transmitting indications and alarms. Fig. 2 is a plan or top view. Fig. 3 is a horizontal section. Fig. 4 is an interior face view of the back board or plate. Fig. 5 is an interior face view of the mount carrying the mercury-chamber and of the scale-ring. Fig. 6 is a front view of the instrument without electrical contacts, and Fig. 7 is a front view of the instrument arranged to give burglary and other alarms.

In all the figures like parts are indicated by similar reference-letters.

We will first describe the instrument represented at Figs. 1 to 5.

According to the invention we employ an annular glass chamber $a$, containing mercury, and within the walls of which are sealed two contact-wires $b$ $c$, $b$ being permanently in contact with the mercury, while $c$ is at a suitable distance above the level of one side thereof when the instrument is in its normal vertical position.

The annular chamber $a$ is made of a glass tube bent into hoop shape and having the ends connected together in such manner as to give free communication all round the same. It is also of such a bore as to avoid nearly all capillary action on the mercury. Also, in order to avoid undue oscillation of the mercury, a contraction $a'$ is made in the lower part of the tubular chamber $a$.

Within the chamber $a$, above the mercury, on either or both sides thereof, is placed an index $d$, and on the top of the mercury, the upper surfaces of which are level with the horizontal zero-points of the scale $e$, is placed a small quantity of creosote, or, as represented in the drawings by the broken lines $f$, that part of the chamber $a$ not occupied by the mercury is nearly filled with creosote, leaving only an air-bubble $f'$ to allow for expansion. When two indices are used, the one on the side of the chamber containing the contact $c$ will be above such contact.

The chamber $a$ is mounted on a metal disk $g$, the back of which is shown at Fig. 5, and such disk $g$ is mounted on a stud or axis $h'$ at the center of the fixed board or plate $h$. The ring-shaped scale $e$, surrounding the chamber $a$, is also fixed to the board or plate $h$, while an index or pointer $g'$ is fixed to the disk $g$ to facilitate adjustment, and thereby enable the mercury to complete the electric circuit with a greater or less roll or inclination of the instrument.

The mount or disk $g$, carrying the chamber $a$, is capable of being fixed rigidly to the back board or plate $h$ by a clamping-nut $i$, screwing onto the screw-threaded stud or axis $h'$, or of being set free for adjustment by loosening said nut. The instrument is provided with a level $j$ to facilitate the fixing thereof in proper position.

The metallic contacts $b$ $c$ are connected as follows with the terminals $k$ $l$, which are mounted on the scale-ring $e$: The contact $b$ is held in metallic connection with the disk or plate $g$ by means of the screw $g^2$ (see Fig. 5) and is in metallic connection with the terminal $k$ through such plate $g$, plate $h$, and scale-ring $e$. The contact $c$ is insulated from the frame and is connected with one end of the insulated conductor $c'$, the other end of which is in metallic contact with the spring or brush contact $c^2$, which latter is insulated from the plate or disk $g$. The spring or brush contact $c^2$ presses upon and is in metallic contact with the ring-shaped contact $c^3$, (see Fig. 4,) which latter is fixed to, but insulated from, the disk or plate $h$. The ring-shaped contact $c^3$ is connected with the insulated terminal $l$ by the insulated conductor $c^4$. The terminals $k$ $l$ are connected with a battery and with a suitable alarm. The instrument is fixed to any suitable support by means of the lugs $m$.

By the above arrangement the mobility of the mercury-chamber is not interfered with, while at the same time the contacts $b$ and $c$ are always in connection with the main conductors, the circuit being completed only when the contact $c$ comes into contact with the mercury.

We would here remark that the terminals $k\ l$ may be otherwise placed, and the connections between them and the contacts $b\ c$ may be varied, so long as freedom of motion is left to the glass chamber $a$.

An instrument constructed as above serves as a ship's clinometer and may be employed to operate an alarm or indicator in any desired position when the ship arrives at a given degree of roll, and in the event of the ship rolling beyond the angle at which the instrument is set to complete an electric circuit the index or indices $d$ will record the amount of such roll. By freeing the mount $g$ on the back board or plate $h$ and turning it round the index or indices $d$ may be reset by the mercury, after which the chamber is again clamped in the required position.

For some purposes, while retaining the scale $e$ and index or indices $d$, the contact-wires $b\ c$ may be dispensed with. An instrument of such description is represented at Fig. 6, in which case the chamber $a$ is a fixture with respect to the back board or plate, while the index or indices $d$ may be reset by loosening the instrument by unscrewing the clamping-screw $n$, thereby liberating the open slotted lug $m'$, and then turning the instrument around on its upper lug $m$. Then when the index or indices are reset the instrument is again turned into its normal position and fixed by the screw $n$. The clamping-screw $n$ screws into a fixed plate $o$.

In some cases, as represented at Fig. 7, the index or indices $d$ may be dispensed with, and the mercury-chamber $a$ fixed to a back board or plate $h$, mounted on a fixed stud or axis $h'^*$, so that the chamber $a$ can be rocked around a central point or axis, and thus close an electrical circuit by the opening of a safe or other door or window or by the movement of any other article acting on the projection $h^2$ by suitable connections. This instrument has terminals $k'\ l'$ fixed to the back board or plate $h$, and to these terminals the contacts $b\ c$ are connected, while a spring $p$ is attached to the said board or plate $h$ to return it to its normal position by bringing the projection $h^2$ against a stop.

Having fully described our invention, what we desire to claim and secure by Letters Patent is—

1. An instrument for indicating a ship's roll and for giving other indications and alarms, comprising an annular tubular glass chamber half filled with mercury and means for carrying such chamber and oscillating it in a vertical plane, substantially as herein set forth.

2. The combination of an annular tubular glass chamber half filled with mercury, a vertical board or plate carrying such chamber and adapted to oscillate it, and an annular scale surrounding the same, substantially as herein set forth and for the purpose stated.

3. The combination of an annular tubular glass chamber having one half filled with mercury and creosote on the top of the mercury, a vertical board or plate carrying such chamber and by means of which it may be oscillated, an annular scale surrounding the chamber, and an index or indices within the chamber, substantially as herein set forth and for the purpose stated.

4. The combination of an annular tubular glass chamber half filled with mercury, a vertical board or plate carrying such chamber, a central stud or axis on which the board carrying the chamber can oscillate in the plane of the chamber, and two electric contacts sealed within the chamber, one at the lower part and the other above the level of the mercury, substantially as herein set forth and for the purpose stated.

5. The combination of an annular tubular glass chamber half filled with mercury, a plate carrying such chamber, a fixed back board having a stud or axis on which the chamber-carrying plate is mounted and on which it can be oscillated in the plane of the chamber, two electric contacts sealed within the chamber, one at the lower part and the other above the level of the mercury, and an annular scale surrounding the chamber, substantially as herein set forth and for the purpose stated.

6. The combination of an annular tubular glass chamber half filled with mercury, a plate carrying such chamber, a fixed back board having a screw-threaded stud or axis on which the chamber-carrier is mounted and on which it can be oscillated in the plane of the chamber, a clamping-nut mounted on the stud or axis, two electric contacts sealed within the chamber, one at the lower part and the other above the level of the mercury, an annular scale surrounding the chamber, two terminals fixed to the instrument, and means for connecting the contacts of the annular glass chamber with said terminals so as to permit of free motion of the chamber on said stud or axis, substantially as herein set forth and for the purpose stated.

In testimony whereof we affix our signatures in presence of two witnesses.

JAS. J. HICKS.
G. H. ZEAL.

Witnesses:
B. J. B. MILLS,
CLAUDE K. MILLS.